(12) United States Patent
Zhang et al.

(10) Patent No.: US 10,506,684 B2
(45) Date of Patent: Dec. 10, 2019

(54) PROTECTION CIRCUIT AND ILLUMINATION DRIVING CIRCUIT

(71) Applicant: JOULWATT TECHNOLOGY (HANGZHOU) CO., LTD., Hangzhou (CN)

(72) Inventors: Junming Zhang, Hangzhou (CN); Guoqiang Liu, Hangzhou (CN); Pitleong Wong, Hangzhou (CN); Yuancheng Ren, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 280 days.

(21) Appl. No.: 15/493,151

(22) Filed: Apr. 21, 2017

(65) Prior Publication Data

US 2018/0241195 A1 Aug. 23, 2018

(30) Foreign Application Priority Data

Feb. 17, 2017 (CN) .......................... 2017 1 0085650

(51) Int. Cl.
*H05B 6/00* (2006.01)
*H05B 37/00* (2006.01)
(Continued)

(52) U.S. Cl.
CPC .......... *H05B 37/00* (2013.01); *H02H 11/005* (2013.01); *H05B 6/00* (2013.01); *H05B 31/006* (2013.01); *H05B 31/28* (2013.01); *H05B 33/0815* (2013.01); *H05B 33/0887* (2013.01); *H05B 41/048* (2013.01)

(58) Field of Classification Search
USPC ............. 315/121, 122, 247, 294; 361/18, 42
See application file for complete search history.

(56) References Cited

U.S. PATENT DOCUMENTS

| 2010/0225251 A1* | 9/2010 | Maruyama | ......... H05B 33/0815 315/307 |
| 2011/0163759 A1* | 7/2011 | Ishii | ....................... H02H 3/162 324/551 |

(Continued)

*Primary Examiner* — Danny Nguyen
(74) *Attorney, Agent, or Firm* — Muncy, Geissler, Olds & Lowe, P.C.

(57) ABSTRACT

A protection circuit and an illumination driving circuit are described herein. The protection circuit comprises a detection circuit, detecting a current flowing through a first switch to obtain a current detection signal and determining whether there is leakage at an input terminal according to the current detection signal; a control circuit, controlling the first switch to switch on intermittently, detecting the current flowing through the first switch by the detection circuit during a switch-on period of the first switch, and keeping the load at a disconnection state if the detection circuit determines there is leakage; and the first switch, connected to the input terminal, and a control terminal of the first switch being connected to the control circuit, and the first switch being controlled by the control circuit to be switched on intermittently. The present invention has the protection function and enhances safety during load removing and installation processes.

4 Claims, 3 Drawing Sheets

(51) Int. Cl.
*H02H 11/00* (2006.01)
*H05B 33/08* (2006.01)
*H05B 31/28* (2006.01)
*H05B 41/04* (2006.01)
*H05B 31/00* (2006.01)

(56) References Cited

U.S. PATENT DOCUMENTS

| | | | |
|---|---|---|---|
| 2014/0055031 A1* | 2/2014 | Miyamoto | H05B 33/0809 |
| | | | 315/82 |
| 2015/0181682 A1* | 6/2015 | Shet | H05B 33/0806 |
| | | | 315/127 |
| 2016/0276824 A1* | 9/2016 | Shin | H02H 3/16 |
| 2016/0344177 A1* | 11/2016 | Wang | H02H 3/335 |

\* cited by examiner

PROTECTION CIRCUIT AND ILLUMINATION DRIVING CIRCUIT

CROSS-REFERENCE TO RELATED APPLICATIONS

This Non-provisional application claims priority under 35 U.S.C. § 119(a) on Patent Application No(s). 201710085650.4 filed in People's Republic of China on Feb. 17, 2017, the entire contents of which are hereby incorporated by reference.

BACKGROUND OF THE INVENTION

Field of the Invention

The present invention relates to the technical field of power electronic technology and, more particularly, to a leakage protection circuit and an illumination driving circuit.

Description of the Related Art

During the installation of a load, since a part of the load may be connected in the installation process, at this time, if a human body contacts the load accidentally, he or she may easily get an electric shock, affecting operation safety. For example, in the illumination field, there are two types of light tubes: single-ended input and double-ended input. The single-ended input actually sets the ports of an AC input terminal at the same end, while the double-ended input sets them at two ends of the light tubes. Since most of lamp stands keep ports for double-ended access, when the original light tubes are exchanged, light tubes with double-ended input are usually used, and thus the light tubes with double-ended input still have a great market share.

However, in the condition of double-ended input, usually one end is inserted into the lamp stand at first, and then the other end is inserted, and since the hands of the operator need to hold the ends of the light tube, he/she may contact the conductive metal at the ends and easily gets an electric shock. In some countries or regions, leakage protection function in such a condition has been taken as a necessary function module in certification standards or specifications. However, in the prior art, there is no protection circuit or structure resolving this technical problem.

BRIEF SUMMARY OF THE INVENTION

The objective of the present invention is to provide a protection circuit and an illumination driving circuit for resolving the technical problem that leakage protection cannot be realized in the prior art, thus to enhance safety during load installation and removing processes.

In order to realize the above objective, the present invention provides a protection circuit, comprising a detection circuit, detecting a current flowing through a first switch to obtain a current detection signal indicating the current flowing through the first switch, and determining whether there is leakage at an input terminal of power supply according to the current detection signal;

a control circuit, controlling the first switch to switch on intermittently, detecting the current flowing through the first switch by the detection circuit during a switch-on period of the first switch; and keeping a load in a disconnection state if the detection circuit determines there is leakage; and the first switch, connected to the input terminal of the power supply, and a control terminal of the first switch being connected to the control circuit, and the first switch being controlled by the control circuit to be switched on intermittently, wherein if the detection circuit determines there is no leakage, the control circuit sends out a control signal indicating that the load is supplied with power normally and the first switch is in a switched-off state.

Optionally, the detection circuit may detect a voltage at the input terminal of the power supply to obtain a voltage detection signal, and the first switch may be controlled to be switched on intermittently when the voltage detection signal reaches a first threshold.

Optionally, the detection circuit may comprise a voltage detection module and a current detection module. The voltage detection module may be connected to the input terminal of the power supply and the control circuit, respectively, one terminal of the current detection module may sample the current flowing through the first switch, and another terminal may be connected to the control circuit.

Optionally, the control circuit may comprise a pulse generation circuit, and the pulse generation circuit may be connected to the voltage detection module and the control terminal of the first switch, respectively.

Optionally, the current detection module may be connected to the control terminal of the first switch through a logic circuit.

Optionally, the first switch may be connected in series with a resistor.

The present invention further provides an illumination driving circuit, comprising:

a rectifying bridge, receiving AC input and rectifying the AC input;

a protection circuit, a first terminal thereof being connected to an output terminal of the rectifying bridge, a second terminal of the protection circuit being connected to another output terminal of the rectifying bridge or one of terminals of AC input power supply;

wherein, a current in the protection circuit is detected to determine whether there is leakage, a load is kept in a disconnection state if the leakage is determined; and the load is supplied with power normally and the detected current in the protection circuit is disconnected if no leakage is determined.

Optionally, the protection circuit may comprise:

a detection circuit, detecting a current flowing through a first switch to obtain a current detection signal indicating the current flowing through the first switch, and determining whether there is leakage at an input terminal of the AC input power supply according to the current detection signal;

a control circuit, controlling the first switch to switch on intermittently, detecting the current flowing through the first switch by the detection circuit during a switch-on period of the first switch, and keeping the load in a disconnection state if the detection circuit determines there is leakage; and the first switch, a first terminal thereof being connected to the output terminal of the rectifying bridge, a second terminal of the first switch being connected to another output terminal of the rectifying bridge or one of the terminals of the AC input power supply, a control terminal of the first switch being connected to the control circuit and being controlled to be switched on intermittently, wherein if the detection circuit determines there is no leakage, the load is supplied with power normally and the first switch is in a switched-off state.

Optionally, the detection circuit may comprise a voltage detection module and a current detection module. Two input terminals of the voltage detection module may be respectively connected to two terminals of the rectifying bridges, two terminals of the AC input power supply, or one output terminal of the rectifying bridge and one of the terminals of the AC input power supply. The voltage detection module may output a voltage detection signal, and the first switch may be controlled to be switched on intermittently when the voltage detection signal reaches a first threshold. One terminal of the current detection module may sample the current flowing through the first switch, and another terminal may be connected to the control circuit.

Optionally, the driving circuit may further comprise a load switch connected in series with the load. The load switch may be kept to be switched off to make the load in the disconnected state if the detection circuit determines there is leakage; and the load switch may be switched on to make the load supplied with power normally if the detection circuit determines there is no leakage.

Optionally, the control circuit may comprise a pulse generation circuit, and the pulse generation circuit may be connected to the voltage detection module and the control terminal of the first switch, respectively.

Compared with the prior art, the technical solutions of the present invention have the following advantages: by switching on the first switch in the protection circuit intermittently and performing current detection during its switching-on period, whether there is leakage is determined according to different currents under normal condition and leakage condition, and leakage protection is achieved when there is leakage. The present invention can perform leakage protection and enhances safety during the installation and removing of loads.

DETAILED DESCRIPTION OF THE INVENTION

Preferred embodiments of the present invention are described hereinbelow in detail with reference to the accompanying drawings, but the present invention is not limited to these embodiments. The present invention covers any alternatives, modifications, and equivalent methods and solutions made within the sprit and scope of the present invention.

In order to make the public thoroughly understand the present invention, specific details are described in detail in the following preferred embodiments of the present invention, and the present invention can be fully understood by persons skilled in the art even without the description of these details.

The present invention will be described more specifically through examples with reference to the accompanying drawings in the following paragraphs. It needs to be explained that all the accompanying drawings are drawn in simplified forms and in imprecise proportions only for the purpose of conveniently and clearly describing the objectives of the embodiments of the invention.

Figure 1:
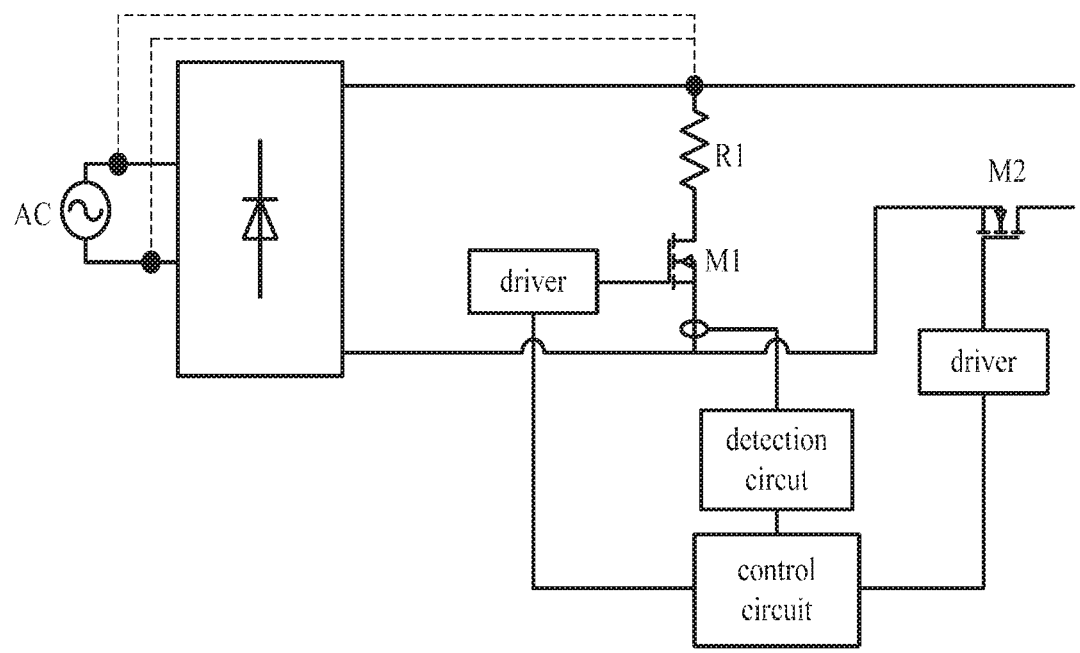
FIG. 1 is a structural schematic diagram of embodiment one of a driving circuit applied with a protection circuit of the present invention.
Figure 2:
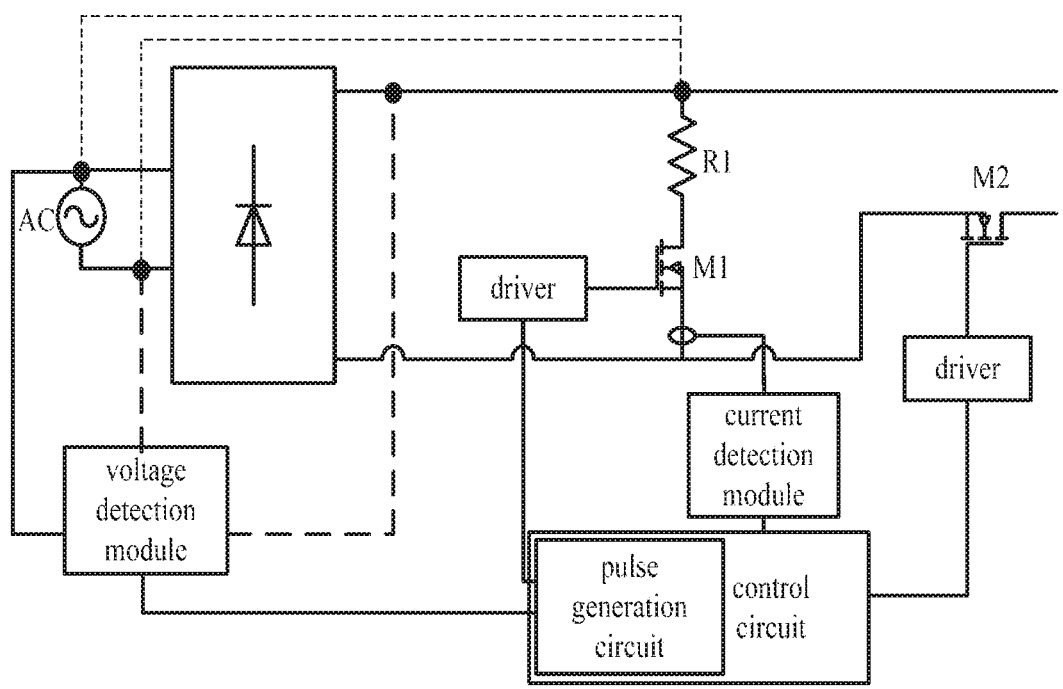
FIG. 2 is a structural schematic diagram of embodiment two of a driving circuit applied with a protection circuit of the present invention.
Figure 3:
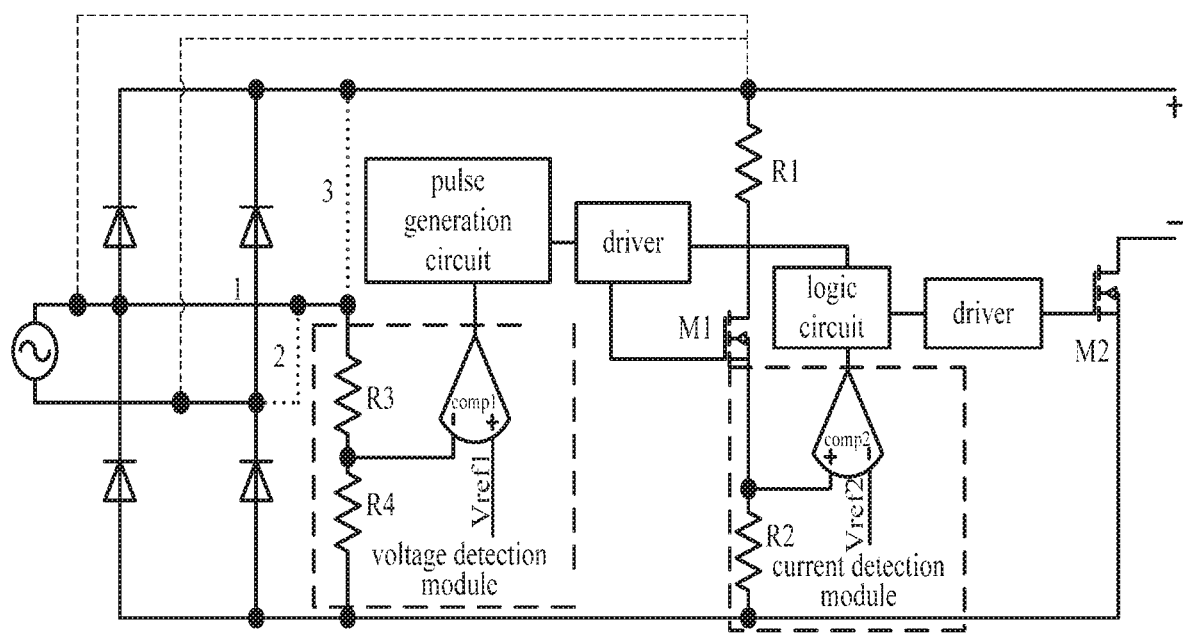
FIG. 3 is a structural schematic diagram of the specific circuit of embodiment two.

FIG. 1 shows a basic structure of embodiment one of a driving circuit applied with the protection circuit of the present invention. If the load is an LED, the driving circuit in the embodiment can be an LED driving circuit. The figure shows a basic solution of the present invention. The protection circuit includes a detection circuit, a control circuit, and a first switch M1, and in the present solution, the detection circuit merely realizes current detection, i.e., detecting a current flowing through the first switch M1 to obtain a current detection signal indicating the current flowing through the first switch M1, and determining whether there is leakage at an input terminal of power supply according to the current detection signal. The control circuit controls the first switch M1 to switch on intermittently, and during a switch-on period of the first switch M1, the detection circuit detects the current flowing through the first switch M1; and if the detection circuit determines there is leakage, the load is kept in a disconnection state, i.e., a load switch M2 is kept disconnected. The first switch M1 is connected in series with a resistor R1, and the two ends of the serial connection structure formed by the first switch M1 and the serially connected resistor R1 are connected to the input terminal of the power supply. The input terminal of the power supply refers that the first terminal thereof is connected to one output terminal of the rectifying bridge (usually referring to the terminal with lower voltage), and the second terminal thereof is connected to another output terminal of the rectifying bridge or one terminal of AC input power supply. FIGS. 1, 2, and 3 show several possible connection manners that the serial connection structure formed by the first switch M1 and the serially connected resistor R1 is connected to the input terminal in broken lines. Unless explained otherwise, the input terminal of the power supply may be an AC input terminal or an output terminal of the rectifying bridge. A control terminal of the first switch M1 is connected to the control circuit, and the control circuit is controlled to be switched on intermittently. If the detection circuit determines there is no leakage, the load switch M2 is switched on to have the load supplied with power normally, and the first switch M1 is switched off to finish the detection.

There are many ways to switch on the first switch M1 intermittently. In the present embodiment, it is realized by using a pulse generation circuit, and the frequency of the pulse generation circuit and the width of the pulse are set according to requirements.

The driver in FIG. 1 is used for driving a switch transistor. The control signal of the control circuit becomes a control signal suitable for switching on and switching off the switch which does not have any substantial influence on the principle of the circuit, and thus this is omitted in the description. However, during the process of actually driving the switch transistor, a driver is usually needed. Those skilled in the art may understand and implement this according to the description of the present invention.

FIG. 2 shows a circuit structure of embodiment two of the driving circuit applied with the protection circuit of the present invention. On the basis of embodiment one, a voltage detection module is added in embodiment two, i.e., the detection circuit includes a voltage detection module and a current detection module. The control circuit defines that the pulse generation circuit is used for controlling the first switch M1 to switch on intermittently.

The two input terminals of the voltage detection module are respectively connected at two terminals of the rectifying bridge, two terminals of the AC input power supply, or one output terminal of the rectifying bridge and one of the terminals of the AC input power supply. The output terminal of the voltage detection module is connected to the control circuit, the pulse generation circuit is used in the control circuit, and the output terminal of the voltage detection module is connected to the pulse generation circuit. The voltage detection module outputs a voltage detection signal, and the voltage detection signal reaches a first threshold. The first threshold may be a set threshold, and the pulse generated by the pulse generation circuit controls the first switch M1 to switch on intermittently, i.e., the first switch M1 is switched on at the time period of the pulse width, and switched off at other time. The advantage of using the voltage detection module is that the threshold may be determined by the voltage detection module, i.e., detection is performed at the first threshold. That is to say, the input voltage at this time is certain, and the first switch M1 is switched on at this time and the current detection is performed. The obtained current detection signal actually indicates the internal resistance of the circuit. Since the internal resistance under the conditions whether there is leakage or not is different (i.e., whether there is human body impedance being accessed), if there is leakage caused by human body, it can be indicated by the current detection signal.

FIG. 3 shows a specific circuit structure of embodiment two. Wherein, the detection circuit includes a voltage detection module and a current detection module, and the voltage detection module includes a voltage-dividing circuit and a comparator comp1. The voltage-dividing circuit is formed by connecting resistors R3 and R4 in series, and the two input terminals are respectively connected to two terminals of the rectifying bridge, two terminals of the AC input power supply, or one output terminal of the rectifying bridge and one of the terminals of the AC input power supply. The broken lines in the figure denote possible connection manners, i.e., the figure shows and exemplifies the connection manners. The output terminal of the voltage-dividing circuit is a common terminal of resistors R3 and R4 and is connected to the negative terminal of the comparator comp1, and the positive terminal of the comparator comp1 receives a signal Vref1 indicating the first threshold. When the voltage detection signal reaches Vref1, the comparator comp1 is turned over, and the pulse generation circuit receives the output signal of the comparator comp1 and sends out the pulse, thus to make the first switch M1 switched on intermittently. Switching-on intermittently refers that each time the comparator comp1 is turned over, at least one pulse is sent out to make the first switch M1 switched on for a short period of time, and the frequency of the pulse signal is related to the output signal of the comparator comp1.

The current detection circuit includes a sample resistor R2 and a comparator comp2, and the sample resistor R2 is connected to the first switch M1 in series. uses the current flowing through the first switch M1 during the switch-on period of the first switch M1, and inputs it into the positive terminal of the comparator comp2. The negative terminal of the comparator comp2 receives a signal Vref2 indicating the second threshold. When the current detection signal is lower than Vref2, which means there is leakage, and at this time, level flip occurs at the output terminal of the comparator comp2, and the load switch M2 is kept switched off through the logic circuit. During a period of time, if the current detection signal is always not lower than Vref2, which means there is no leakage, the load switch M2 is switched on at this time so as to have the load supplied with power normally, and the first switch M1 is switched off, finishing the leakage detection.

In addition to this, though the above describes and explains the embodiments separately, for part of the common technologies, they may be replaced and combined among the embodiments by those ordinary skilled in the art. For contents which are not clearly described in one of the embodiments, please refer to other embodiments which have the related contents.

The above implementing manners are not restrictions to the protection scope of the technical solution. Any modifications, equivalent alternatives and improvements made within the spirit and principle of the above implementing manners shall be contained in the protection scope of the technical solution.

What is claimed is:

1. An illumination driving circuit, comprising:
   a rectifying bridge, receiving AC input and rectifying the AC input; and
   a protection circuit, a first terminal of the protection circuit being connected to an output terminal of the rectifying bridge, a second terminal of the protection circuit being connected to another output terminal of the rectifying bridge or one of terminals of AC input power supply;
   wherein, a current in the protection circuit is detected to determine whether there is leakage, a load is kept in a disconnection state if the leakage is determined; and the load is supplied with power normally and the detected current in the protection circuit is disconnected if no leakage is determined;
   wherein the protection circuit comprises:
      a detection circuit, detecting a current flowing through a first switch to obtain a current detection signal indicating the current flowing through the first switch, and determining whether there is leakage at an input terminal of the AC input power supply according to the current detection signal;
      a control circuit, controlling the first switch to switch on intermittently, detecting the current flowing through the first switch by the detection circuit during a switch-on period of the first switch, and keeping the load in the disconnection state if the detection circuit determines there is leakage; and
      the first switch, a first terminal of the first switch being connected to the output terminal of the rectifying bridge, a second terminal of the first switch being connected to another output terminal of the rectifying bridge or one of the terminals of the AC input power supply, and a control terminal of the first switch being connected to the control circuit and being controlled to be switched on intermittently by the control circuit, wherein if the detection circuit determines there is no leakage, the load is supplied with power normally and the first switch is in a switched-off state.

2. The illumination driving circuit of claim 1, wherein the detection circuit comprises a voltage detection module and a current detection module, two input terminals of the voltage detection module are respectively connected to two terminals of the rectifying bridges, two terminals of the AC input power supply, or one output terminal of the rectifying bridge and one of the terminals of the AC input power supply, the voltage detection module outputs a voltage detection signal, the first switch is controlled to be switched on intermittently when the voltage detection signal reaches a first threshold; one terminal of the current detection module samples the current flowing through the first switch, and another terminal is connected to the control circuit.

3. The illumination driving circuit of claim 2, further comprising a load switch connected in series with the load, wherein the load switch is kept to be switched off to make the load in the disconnected state if the detection circuit determines there is leakage; and the load switch is switched on to make the load supplied with power normally if the detection circuit determines there is no leakage.

4. The illumination driving circuit of claim 1, wherein the control circuit comprises a pulse generation circuit, the pulse generation circuit is connected to the voltage detection module and the control terminal of the first switch, respectively.

* * * * *